A. J. ODELL.
TOOL FOR CUTTING MEATS.
APPLICATION FILED APR. 24, 1919.
1,316,503.
Patented Sept. 16, 1919.
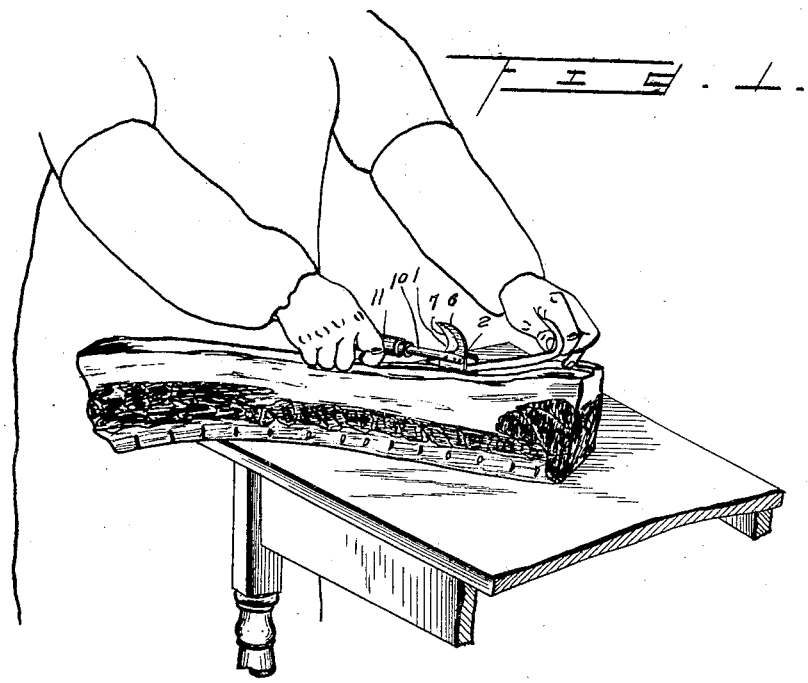
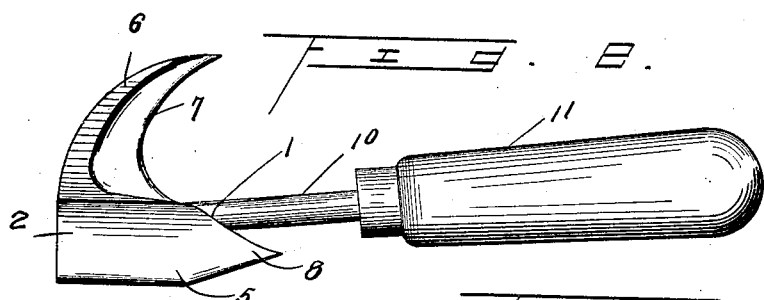
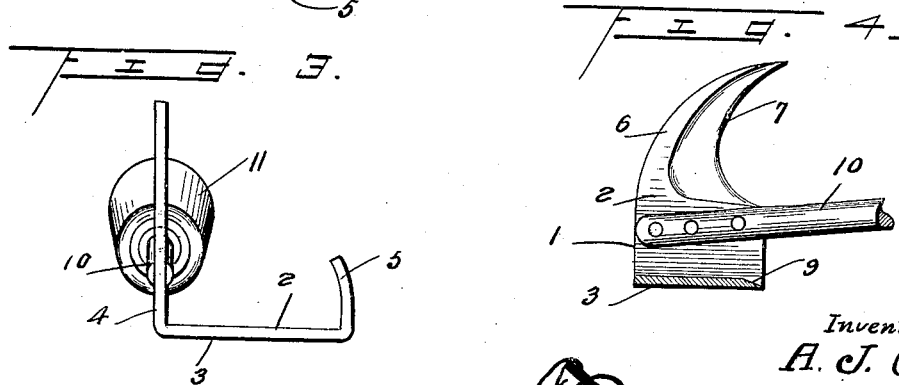
Inventor.
A. J. Odell.
By _____ Attorney.

UNITED STATES PATENT OFFICE.

ARTHUR J. ODELL, OF BATAVIA, NEW YORK.

TOOL FOR CUTTING MEATS.

1,316,503.    Specification of Letters Patent.    Patented Sept. 16, 1919.

Application filed April 24, 1919. Serial No. 292,384.

*To all whom it may concern:*

Be it known that I, ARTHUR J. ODELL, a citizen of the United States, residing at Batavia, in the county of Genesee and State of New York, have invented certain new and useful Improvements in Tools for Cutting Meats; and I do hereby declare the following to be a full, clear, and exact description of the invention, such as will enable others skilled in the art to which it appertains to make and use the same.

This invention relates to tools and the primary object of the invention is to provide an improved tool for facilitating the slicing, skinning and trimming of meats.

A further object of the invention is to provide an improved combined tool for slicing, skinning and trimming meats, which is so formed that the same can be conveniently and easily used, and liability of the user cutting himself is eliminated.

A still further object of the invention is to provide an improved device of the above character, which is extremely durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a perspective view of the improved tool.

Fig. 2 is a side elevation of the same.

Fig. 3 is an end elevation of the same.

Fig. 4 is a horizontal section through the same.

Referring to the drawings in detail, wherein similar reference characters designate corresponding parts throughout the several views, the numeral 1 generally indicates the improved tool which includes the substantially U-shaped member 2, which is formed of suitable metal and the U-shaped member includes the straight base portion 3 and the upstanding arms 4 and 5. The arm 4 is provided with the upstanding reduced arcuate extension 6 having the inner edge thereof sharpened as at 7 to form a cutting edge. The arm 5, is curved outward and is provided with the inwardly extending pointed extension 8, which has the upper and lower edges thereof sharpened to form a cutting edge. The inner edge of the base 3 is also sharpened, as at 9, and is used for trimming the meat, as will be hereinafter more fully described in the use of the tool.

A shank 10 is secured to the arm 4 directly below the extension 6 and the same is provided with a handle 11, whereby the tool may be conveniently used.

In operation of the improved device, the extension 8 forms the slicer and when it is desired to remove the skin and trim a piece of meat, the point of the extension 8 is stuck into the meat and drawn along the same so as to make a relatively deep cut into the same. The extension 6 which forms the skinner is then inserted under the skin and drawn along until the same is severed from the meat. When it is desired to trim the meat, the cutting edge 9 is dug into one end of the meat the depth of which it is desired to remove the fat and the tool is then drawn toward the user, which effectively cuts the fat therefrom, as clearly shown in Fig. 1.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A tool for slicing, skinning and trimming meats comprising a U-shaped member having the rear end of the web portion sharpened, and angularly related extensions formed on the legs thereof, said extensions having sharpened edges, and a handle carried by one of said legs, as and for the purpose specified.

2. A tool for slicing, skinning and trimming meat comprising a U-shaped metallic member having one edge of the web portion thereof sharpened, an upstanding arcuate extension formed on one leg, said extension having the inner edge thereof sharpened, and an inwardly extending pointed extension formed on the opposite leg, said extension having its upper and lower edges sharpened, and a handle secured to one of said legs, as and for the purpose specified.

In testimony whereof I affix my signature in presence of two witnesses.

ARTHUR J. ODELL.

Witnesses:
 GEORGE H. PADDOCK,
 CHARLES A. WEAVER.